US006140662A

United States Patent [19]
Lim et al.

[11] Patent Number: 6,140,662
[45] Date of Patent: Oct. 31, 2000

[54] SENSING SYSTEM AND METHOD

[75] Inventors: Ah Peng Lim; Baskar Parthasarathy, both of Singapore, Singapore

[73] Assignee: Hewlett-Packard Company, Palo Alto, Calif.

[21] Appl. No.: 09/226,978

[22] Filed: Jan. 8, 1999

[51] Int. Cl.[7] .................... G01N 21/00

[52] U.S. Cl. .................... 250/559.38; 250/551.29; 250/221; 356/381

[58] Field of Search .................... 250/559.38, 551.31, 250/551.29, 559.4, 221, 222.1, 559.19; 356/381

[56] References Cited

U.S. PATENT DOCUMENTS

| | | | |
|---|---|---|---|
| 5,946,541 | 8/1999 | Kakigi | 399/405 |
| 5,986,255 | 11/1999 | Guillot et al. | 250/214 |

*Primary Examiner*—Georgia Epps
*Assistant Examiner*—Tim Thompson

[57] ABSTRACT

A sensing system is used to sense when a stack of sheet material reaches a critical height. A light beam is shone onto a region on the surface of the stack to form a lighted area. Changes in the height of the stack of sheet material results in changes in size of the lighted area of the beam shining on the surface of the stack. A light detector monitors a zone on the stack surface in which the amount of light being monitored as shining on the zone varies in accordance with changes in size of the lighted area. The detection system detects when the lighted area has reached a predetermined size by detecting when the light shining on the zone has reached a predetermined point. The system then provides an indication that the stack surface has reached a critical height, in other words that the stack surface has reached a critical distance from the light source.

12 Claims, 6 Drawing Sheets

SENSING SYSTEM AND METHOD

FIELD OF INVENTION

This invention relates to a sensing system used to sense when a stack of sheet material reaches a critical height, which has particular but not exclusive application in sensing the amount of paper or sheet material in printing apparatus such as computer printers, notably ink jet printers. The invention also relates to a method of using such a sensing system.

BACKGROUND

It is often necessary to ascertain the height of a stack of sheet material in a printer, such as an ink jet printer or laser printer, and also in other machines where stacks of sheet material are processed such as photocopiers.

A known approach to sensing the height of a stack of sheet material is to rest an actuator on the uppermost surface of the stack. As sheets are either added or removed from the stack, the actuator rides on the stack surface or the uppermost sheet in the stack. The actuator is connected mechanically to a device that senses when the stack has reached a critical height. This critical height may either be a maximum or minimum. For example, sensing a maximum height would be important in ascertaining when an output tray of a printer is full. Sensing a minimum height is important when ascertaining when a paper tray is close to being empty.

A problem with using a mechanical actuator is that there is physical contact of the paper surface, or other such sheet material. Such contact is particularly disadvantageous in output trays used in ink jet printers, since physical contact may smudge or smear the ink used in ink jet printers. However, even in other printers, physical contact may mar the surface of the sheet material, perhaps when the sheet material has a delicate surface, for instance in high gloss papers.

An object of the present invention is to substantially ameliorate at least some of the problems discussed in relation to the prior art, and it is not necessary that the invention in its broadest aspect should overcome each and every one of the abovementioned problems.

SUMMARY OF THE INVENTION

According to one aspect of the invention, there is provided a sensing system adapted to sense when a stack of sheet material reaches a critical height. The sensing system includes a light source which is distanced from the stack surface and is adapted to shine onto a region on the stack surface to form a lighted area. The arrangement is such that the lighted area changes in size according to the distance between the light source and the stack surface. The system also includes a detection system for detecting changes in size of the lighted area. This detection system provides an indication that the stack surface has reached a critical distance from the light source when the detection system detects that the lighted area has reached a predetermined size.

According to a further aspect of the invention, there is also provided a method of sensing when a stack of sheet material reaches a critical height. The method includes the step of using a light source to shine light on the stack surface to form a lighted area such that the lighted area changes in size according to the distance between the light source and the stack surface. A detection system is used to detect changes in size of the lighted area such that the detection system provides an indication that the stack surface has reached a critical distance from the light source when the detection system detects that the lighted area has reached a predetermined size.

According to another aspect of the invention, there is provided for an improvement to an ink jet printer by incorporating the abovementioned system in the ink jet printer.

The present invention is based on applying the concept of distance sensing to the problem of detecting the height of a sheet material stack. This concept resides in detecting a change in size of a beam area, preferably by detecting reflected light from an illuminated or lighted area as the stack of sheet material changes in height, either increasing or decreasing. Furthermore, two light sensors may be used, one of which is biased higher relative to the other light source, leading to a different rate of measuring the illuminated or lighted area. The differing rates can provide a cross-over point that can be measured leading to an output signal that the sheet material is at a critical height.

DRAWINGS

In order that the invention might be more fully understood, embodiments will be described, by way of example only, with reference to the accompanying drawings, in which.

Figure 4B:
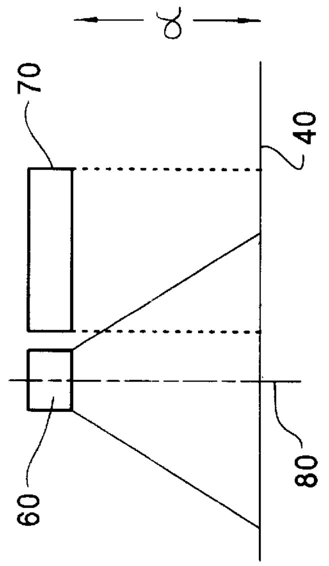
Figure 4B:
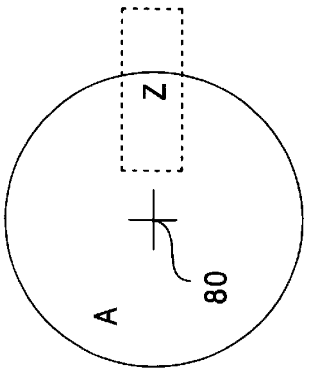
Figure 4A:
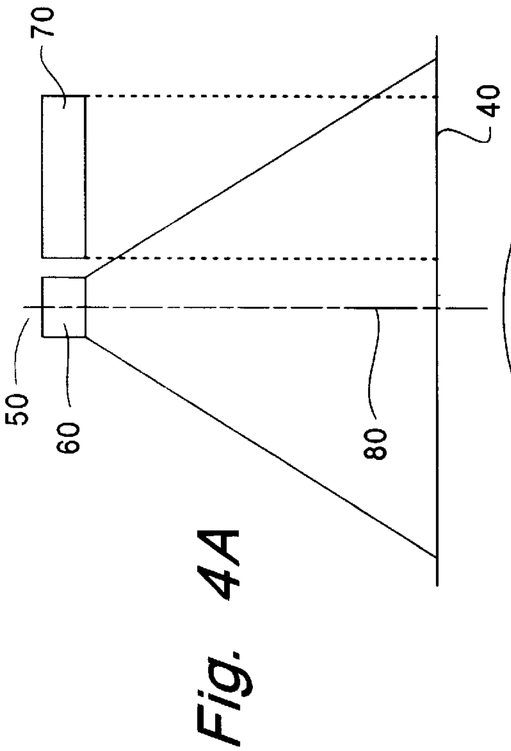
Figure 4A:
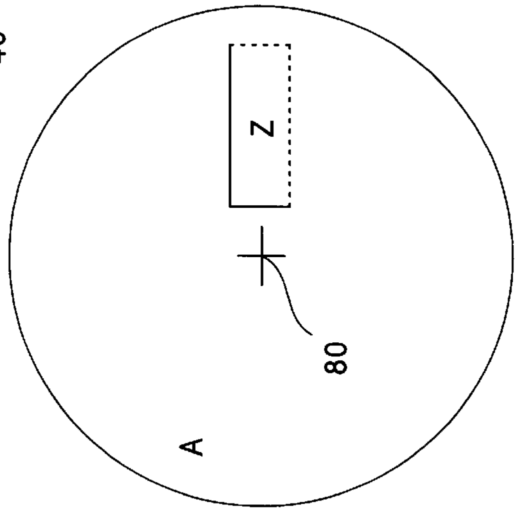
Figure 5:
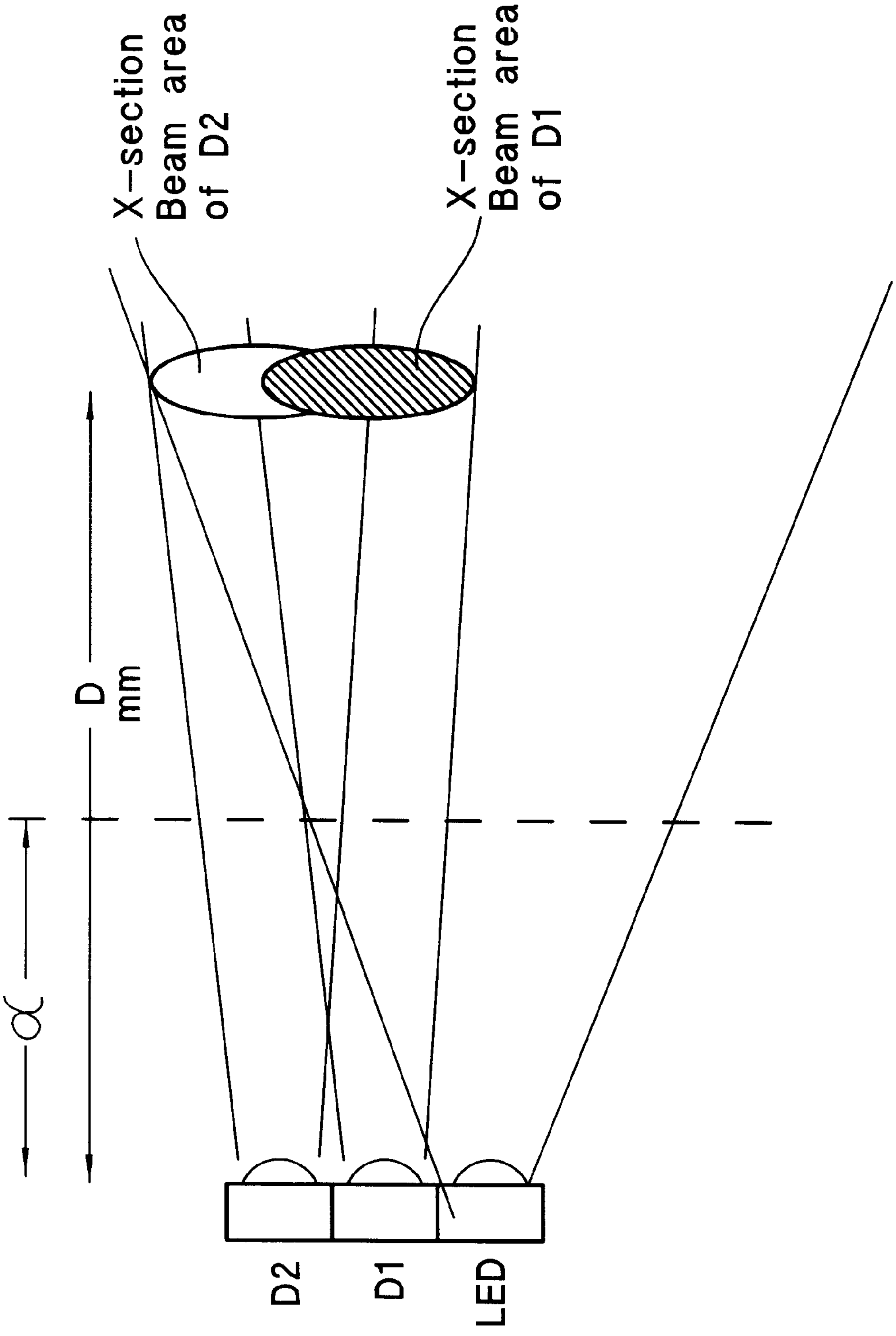
Figure 6:
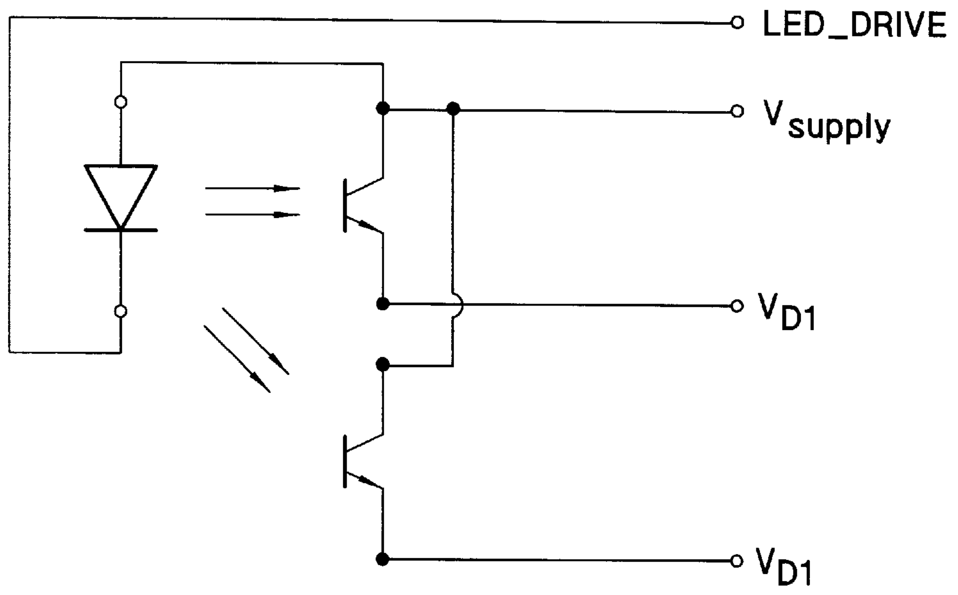
Figure 7:
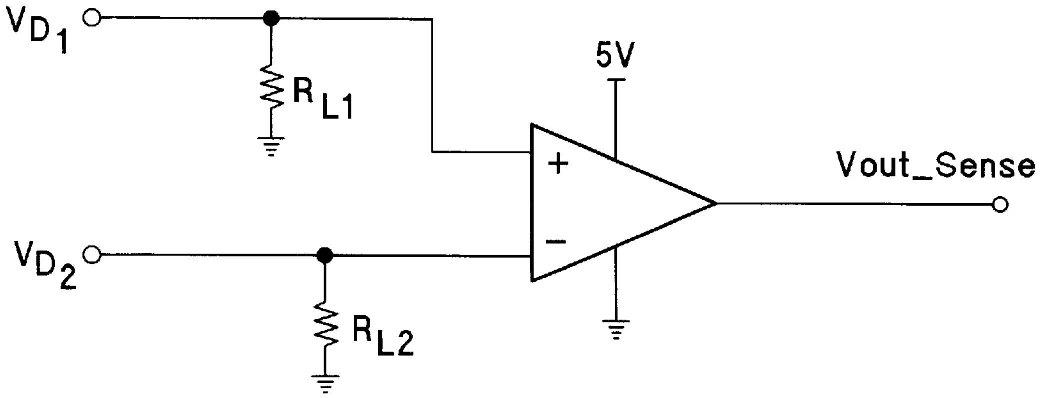
Figure 8:
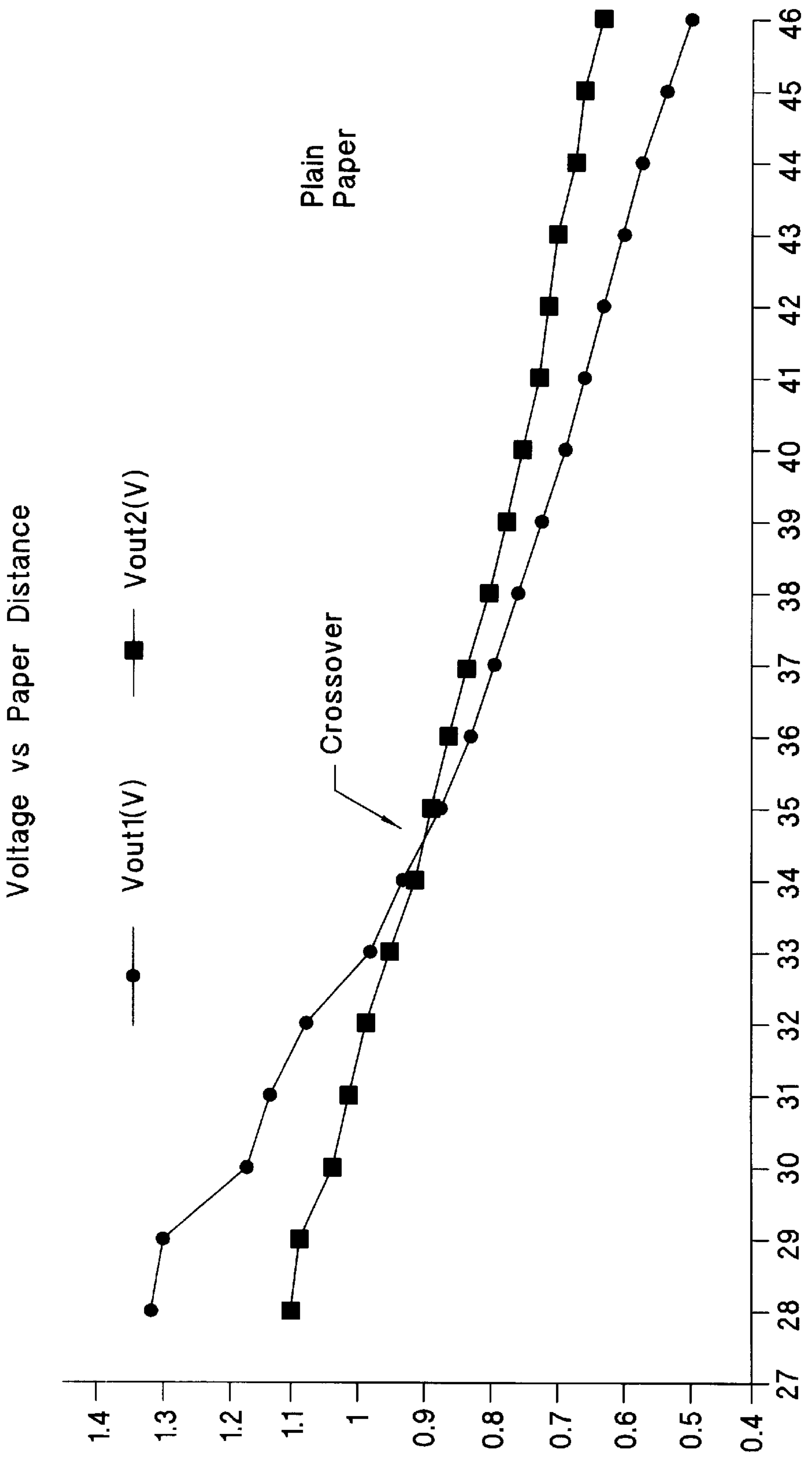
Figure 9:
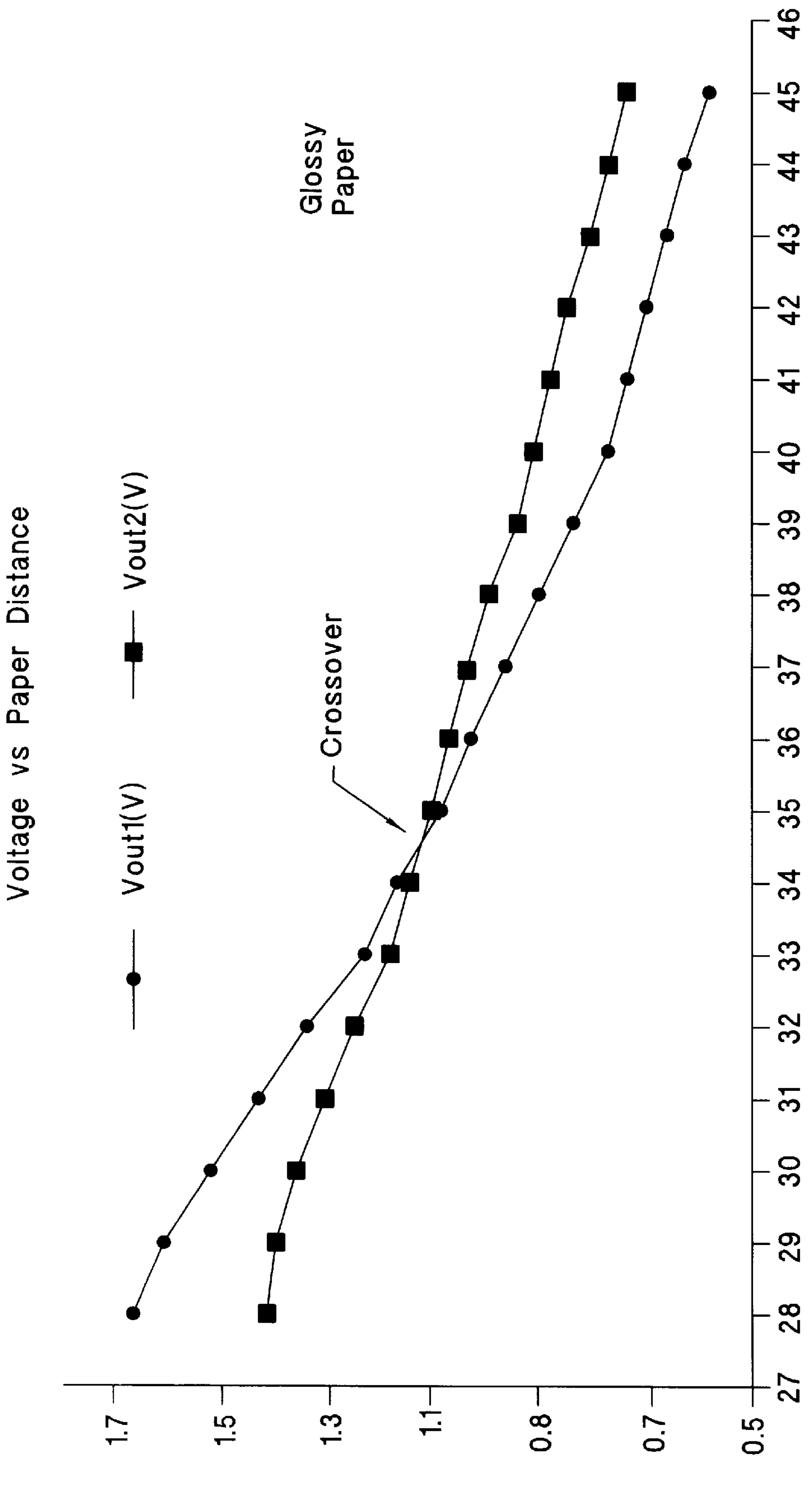

FIGS. 4A and 4B are schematic diagrams showing how illumination on a lighted area, and an overlapping zone, on the stack surface are each affected by a greater and smaller distance between the sensor and the stack surface varies, respectively in each Figure. FIG. 4B illustrates the instance where there is a smaller distance between the light source and the stack surface as compared to the situation illustrated in FIG. 4A;

FIGS. 4AA and 4BB show a plan view of the systems shown respectively in FIGS. 4A and 4B;

FIG. 5 is a cross-sectional diagram of a L.E.D. light source and two light detectors used in the present embodiment;

FIG. 6 is a schematic diagram of an output sensor in the embodiment;

FIG. 7 is a portion of a circuit diagram relating to the detection circuit of the output sensor FIG. 8 shows a graph of detector output voltage versus stack height for plain paper; and FIG. 9 shows a graph similar to the one in FIG. 8 but in respect of glossy sheet media.

EMBODIMENTS

Figure 1:
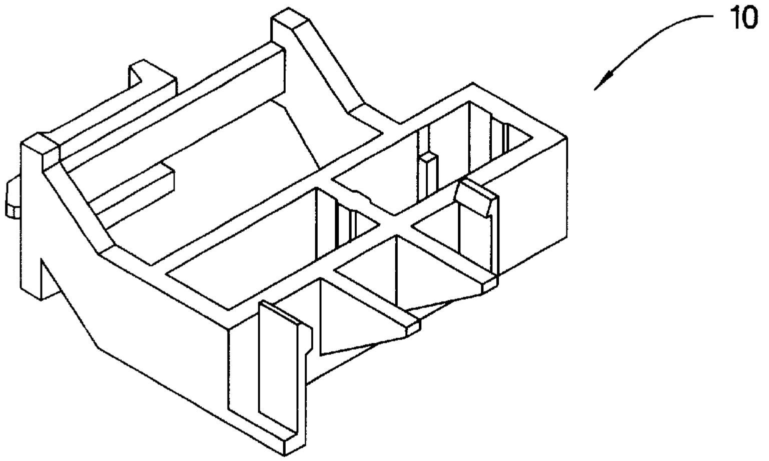
FIG. 1 is a perspective view of a mechanical housing of a printer in which components of an embodiment of the invention are installed.

Referring to the drawings, FIG. 1 illustrates mechanical housing 10 of a ink jet printer in which components of an embodiment of the invention are installed. The embodiment is described in the context of an ink jet printer, but the invention is applicable in other devices in which sheets of material is processed and printed in some manner, such as laser printers, photocopiers, facsimile machines and the like.

Other sheet material, such as polymer sheet films, photographic or photosensitive sheet film and other sheet material may be used to form the stack of material.

Figure 2:
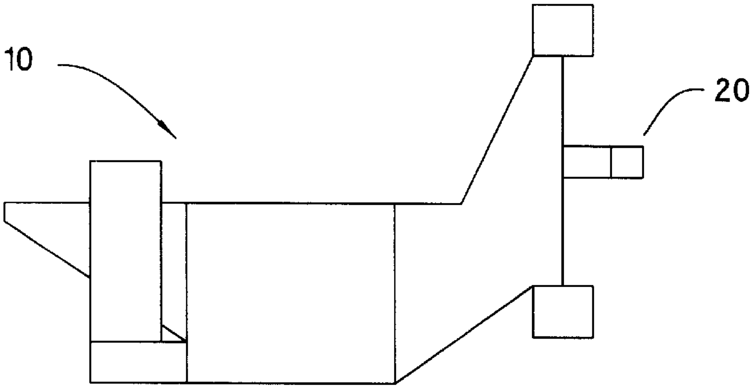
FIG. 2 is a side view of the mechanical housing shown in FIG. 1.
Figure 3:
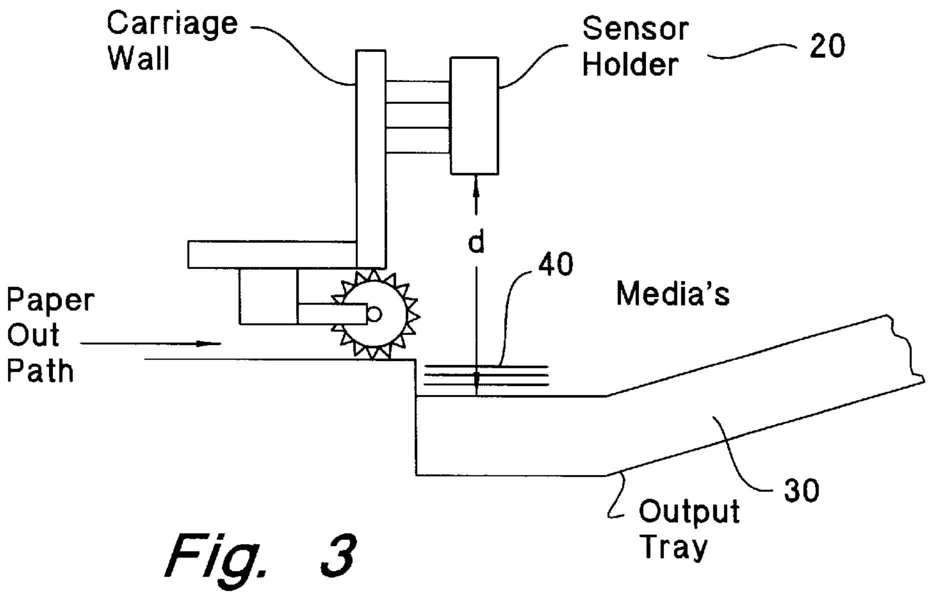
FIG. 3 is a schematic side view of the printer showing the manner in which a sensor is positioned in the printer in the present embodiment.

FIG. 2 shows a side view of the housing 10. A sensor holder 20 projects forwardly at the front of the housing. In FIG. 3, which is a similar side view of the housing 10, it is apparent that the sensor holder 20 is positioned directly above the path along which freshly-printed paper or sheet material exits the printer. The sensor holder 20 is mounted near the carriage wall directly on top of the paper bottom of form (B.O.F.). The sensor is mounted to read the bottom of the sheet since, in the embodiment, the bottom part of the sheet does not receive any printing, which arises as a result of the mechanical construction and drive constraints in the printer. It is preferable to monitor the size of the lighted area on part of the sheet that does not receive printing, since there is less likelihood of variations in colour and textural content having an influence on the reflectance readings.

The sensor housing is mounted on the front wall of the carriage such that a constant distance is maintained between the sensor housing 20 and the base of the output tray 30.

The printed paper rests in an output tray 30 in which a stack of paper 40 grows as each succeeding sheet is added to the tray 30. The sensor holder 20 houses a sensing system (shown in later Figures).

FIG. 4A illustrates a schematic diagram of a sensing system (shown generally as 50). The sensing system is adapted to sense when the stack 40 of sheet material in the tray 30 reaches a critical height.

The sensing system includes a light source in the form of an L.E.D. light source 60. The L.E.D. light source 60 shines onto a region on the uppermost sheet of the stack surface 40 to form a lighted area A. Light from the L.E.D. light source 60 is divergent and forms a spreading cone of light. In the exemplary embodiment, light from the light source 60 shines directly onto the uppermost sheet. However, in other embodiments, the light can take an indirect path towards the stack surface, for example, by being directed by one or more lenses or mirrors, or prisms. Furthermore, the light from the light source is of a sufficiently high intensity such that the effect of ambient light on the system is negligible. However, the system may be modified to compensate for changes in ambient lighting conditions if required by the particular parameters of the embodiment.

FIG. 4A shows the L.E.D. light source 60 positioned further from the stack surface 40, whereas FIG. 4B shows the stack surface positioned closer to the L.E.D. light source 60.

Since the L.E.D. light source 60 is divergent, it means that as the distance between the light source and the stack surface decreases, the size of the lighted area A decreases. Similarly, the size of lighted area A increases as the distance between the light source and stack surface increases. This is best seen when comparing FIGS. 4AA and 4BB, the lighted area A changes in size according to the distance between the light source and the stack surface. Lighted area A decreases in size as the light source is positioned closer to the stack surface.

A light detection system is provided in the form of a light detector 70. In order to monitor changes in the size of the lighted area A, the light detector 70 monitors a zone Z on the stack surface 40. The zone Z generally overlaps lighted area A. Hence, changes in size in lighted area A affect the amount of light received by the zone Z. As best seen when comparing FIGS. 4AA and 4BB, the amount of light shining onto zone Z changes according to the distance between the light source and the stack surface. In FIG. 4AA, where the stack surface is further from the light source, zone Z receive full illumination. However, when the stack surface is positioned closer to the light source, lighted area A decreases in size. Hence, the amount of light shining on the zone Z varies in accordance with changes in the size of lighted area A.

In comparing FIGS. 4AA and 4BB, the zone Z is positioned in relation to the lighted area A such that, as the distance between the light source and the stack surface decreases, the light shining on said zone recedes across the zone Z back in a direction travelling towards the axis 80 of the divergent beam emanating from the L.E.D. light source 60. (In the Figures, the edge of the lighted area A is illustrated as travelling from right to left across zone Z).

The detection system 50 detects when the lighted area A reaches a certain predetermined size. In the embodiment, this is achieved by monitoring the light that is reflected from the zone. It is possible to identify when the lighted area has reached a certain size. This is achieved by monitoring when the light shining on the zone Z has reached a predetermined point on the stack surface. When the light of the zone reaches this predetermined point, it means that the lighted area has reached a predetermined size. Hence, at this predetermined point, the stack surface would have reached a critical maximum height. In this manner, the detection system 50 provides an indication that the stack surface has reached a critical distance (d) from the light source. This indication is given as an electronic signal to an electronic control circuit (not shown) in the ink jet printer, so that no further sheets will be printed until the stack height has been reduced by removing some of the sheets.

In the embodiment shown in FIG. 5, the detection system includes at least a first light detector D1 and a second light detector D2. In the embodiment, each detector is an Infrared reflective detector manufactured by Sharp Corporation, model number GP2S28. It would be well understood that other suitable detectors could also be used. The light detectors D1, D2 are mounted side by side as shown in the FIG. 5. In the exemplary embodiment, the system is provided with at least two detectors D1, D2, but it is possible that other embodiments may be provided with a larger number of detectors or points of detection. For instance, the system may be provided with a bank of detectors each of which is sequentially arranged to monitor a different part of the anticipated path of the zone.

The voltage output of the each detector D1, D2 is proportional to the amount of light from the L.E.D. light source 50 that is reflected back to the detectors from the stack surface. As shown in FIGS. 4A and 5, the two detectors D1, D2 are arranged such, when the output tray is relatively empty, the field of view of each of the detectors D1, D2 crosses the beam of light emanating from the L.E.D. light source 50.

Each light detector D1, D2 monitors a different part of the zone Z. The predetermined point, corresponding to when the stack grows to a maximum height, is reached when each of said detectors detects a predetermined level of light.

In FIGS. 4A and 4B, the first light detector D1 monitors a part of the zone Z closer to the axis 80 of the light beam. The second light detector D2 monitors another part of the zone Z further away from the axis 80 of the light beam. When the stack surface is quite a distance from the light detectors D1, D2, which is the case when the output tray 30 contains a small number of sheets, each of the light detectors D1, D2 is faced with an equivalent amount of light reflected from the zone Z directly under each detector. However, as the height of the stack increases, the stack surface rises and draws closer to the light detectors D1, D2. Consequently, the amount of light detected by the second detector D2 will gradually decrease in comparison to the amount of light monitored by the first detector D1. This is because the second detector D2, which is located further away from the axis 80 of the light beam, will be the first of the two detectors to experience the receding of the circumferential edge of lighted area A underneath the detector. This can also be seen in FIG. 5, with reference to areas 51 and 52, corresponding to beam area D1 and D2 respectively. As the stack height increases, 51 and 52 effectively decrease by moving towards the crossover point indicated by the dotted line d. 52 will decrease faster than 51 due to their proximity with regard to LED 50.

BIASING

In a preferred further embodiment, the second light detector D2 is biased higher than the first light detector D1 to provide the second light detector D2 with an initially higher output voltage. The system can be calibrated such that the predetermined point is reached when the voltage output of the second light detector D2 falls to the same level as that of the first light detector D1. Referring to FIGS. 4A and 5, when the stack surface is at a distance D away from light detectors D1, D2 each detector receives a similar amount of light being reflected up from the surface of the stack. However, in this preferred embodiment, detector D2 is biased at higher output load with respect to D1. Therefore, even though the level of light detected by each detector is the same, the output voltage of D2 is greater than D1. Next, when the stack of sheet material grows higher and draws closer to a distance d closer to the detectors, the amount of light reflected from the portion of the zone beneath detector D2 is decreasing at the faster rate than that of detector D. Hence, at a distance d, a cross-over occurs. In other words, the output voltage of detector D2 at this point becomes smaller than the output voltage of detector D1. In the embodiment illustrated in FIGS. 6 and 7, to detect at the fixed distance of 34 mm, the output road $R_{L2}$ and $R_{L1}$ are adjusted to 20.85 kOhm and 13 kOhm respectively. The analog output voltages are connected to the comparator as shown. When the stack surface reaches a height of about 34 mm from the light detectors, the voltage (V1) will be greater than the voltage (V2) and the output of the comparator changes states. The states change will be detected by the printer control and displayed on the printer display to direct the user to remove the paper from the output tray.

Specific examples of voltage variation graphs are shown in FIGS. 8 and 9. From FIGS. 8 and 9, the plain paper and the glossy paper both exhibit the voltage cross-over at about 34–35 mm.

Once the full output tray 30 has been cleared, the process repeats and the cut-off point occurs again when the stack in output tray 30 reaches the same distance of 35 mm which is the general cut-off point in this example.

The present invention is based on the principle of applying the concept of fixed distance sensing to the problem of detecting the height of sheet material in a pile. This concept resides in detecting changes in size in a decreasing, or possibly increasing, lighted area, as the pile of sheet material increases or decreases in height. The detection system provides an indication that the pile surface has reached a critical distance from the light source when the detection system detects that the lighted area has reached a certain size. In the embodiment, this is achieved by using a light detector to detect when the light shining on the zone has reached a predetermined point.

Thus, the invention is based on the principle of sensing the height of a stack of sheet material, by detecting changes in the size of a lighted region on the surface of the stack. An advantage in monitoring changes in the size of the lighted area, rather than detecting absolute values of reflected light, is that the system is able to be used with a wide range of sheet material that have different reflectance values. For instance, as indicated above, the reflectance of matt, glossy and ultra-glossy materials can vary considerably. Say, for example, it is intended for the maximum stack height to be five centimeters. At this height, the reflectance will depend on the reflectivity of the sheet material, and hence it would be impossible to identify when the maximum stack height had been reached simply by relying on absolute reflectance values, because such absolute values will vary with the choice of sheet material. Instead, the system is capable of being adapted for use with a wide range of materials with different reflectances, because the system operates by identifying changes in the size of the lighted area, rather than depending on the reflectance values.

In those embodiments of the invention that incorporate at least two light detectors where one of detectors is biased in the manner described above, there will always be a cut-off point which occurs when the output of one detector falls to the same level as the second detector. This phenomenon of a cut-off point will occur, regardless of the reflectivity of the sheet material. For a matt material, the cut-off occurs at a low level of reflectance. For a glossier material, the cut-off occurs at a higher reflectance value. The cut-off point is identified when the outputs of the two detectors converge. The system can identify the convergence of the output of the two detectors, regardless of the absolute value of the reflectance of this cut-off point. Hence, embodiments of the system that incorporate at least two biased detectors are less likely to be influenced by the relative reflectances of the sheet material, and can thus work well with matt, glossy and even high gloss materials.

The embodiment has been described in terms of a stack of sheet material increasing in height as sheets are progressively added to the stack. The sensing system senses when the stack reaches a maximum height. An example is the output trays of printers that fill up with paper. However, embodiments of the invention may also used for sensing when a stack has decreased to a minimum height. For instance, the height of paper in a paper tray in a printer progressively decreases as paper is used up. The sensing system may sense when the tray is close to becoming empty. Hence, in this specification, wherever there is mention of a decrease in the distance between the light source and the stack surface, it is understood that the opposite definition would equally apply to an embodiment that is directed, vice versa, to the opposite instance of the stack decreasing in size such as when paper is used up in a paper tray, where the sensing system is adapted to sense when the stack reaches a critically low height. The use of to the present system to sense critically low heights is within the scope of the invention.

Using this system of sensing the height of a stack of sheet material, the system is relatively unaffected by dust build-up, temperature variations, process variations and the effect of ageing of the L.E.D. light sources. The critical cut-off points for most papers fall within a similar range, regardless of whether plain or glossy paper is used. Furthermore, the system functions without moving parts or any physical optical path, each of which could degrade over time.

Most importantly, the height of the stack can be sensed without an actuator having to physical contact the surface of the sheet material. Since there is no physical contact with the sheet material, printer throughput is not affected.

In this specification, the use of the word axis to describe a reference point of the light beam should not be taken to imply that the invention is limited to having the light beam shining absolutely vertically. It is possible for the light source to be positioned to one side of the region on the stack surface, and for the light to shine on the stack surface at an acute angle. In such embodiments, the axis of the beam would generally refer to the central region of the light beam.

Embodiments of the invention may be used in other devices which contain stacks of sheet material the height of which should remain within acceptable limits, for example, in photocopiers, facsimile machines and any other such devices where sheet material is fed to form a stack. In such cases, the invention is useful for ensuring that the stack does not increase, or decrease, beyond acceptable limits.

The embodiments have been described by way of example only and modifications are possible within the spirit and scope of the invention as defined in the appended claims.

What is claimed is:

1. A sensing system adapted to sense when a stack of sheet material reaches a critical height, the sensing system including:

a light source distanced from the stack surface and adapted to shine onto a region on the stack surface to form a lighted area such that said lighted area changes in size according to the distance between the light source and the stack surface;

a detection system for detecting changes in size of the lighted area;

wherein the detection system provides an indication that the stack surface has reached a critical distance from the light source when the detection system detects that the lighted area has reached a predetermined size.

2. A sensing system according to claim 1 wherein the detection system consists of a light detection system arranged and adapted to monitor a zone on the stack surface in which light monitored as being reflected from the zone varies in accordance with changes in size of said lighted area;

such that the detection system detects that the lighted area has reached the predetermined size when the light shining on the zone has reached a predetermined point.

3. A system according to claim 2, wherein the zone generally overlaps said lighted area.

4. A system according to claim 3, wherein the light source is divergent such that, as the distance between the light source and the stack surface decreases, said lighted area decreases and said zone receives progressively less light.

5. A system according to claim 4, wherein the zone is positioned in relation to said lighted area such that, as the distance between the light source and the stack surface decreases, the light shining on said zone recedes across said zone back towards the axis of the divergent beam.

6. A system according to claim 2, wherein the detection system includes at least a first and a second light detector each adapted to monitor a different part of said zone such that said predetermined point is reached when each of said detectors detects a predetermined level of light.

7. A system according to claim 6, wherein the first light detector is adapted to monitor a part of the zone close to the axis of the light beam and the second light detector is adapted to monitor another part of the zone further away from the axis of the light beam.

8. A system according to claim 7, wherein the second light detector is biased higher than the first light detector to provide said second light detector with an initially higher output voltage such that said predetermined point is reached when the voltage output of the second light detector eventually falls to the same level as that of the first light detector.

9. A system according to claim 1, wherein said light source is an infrared source.

10. An ink jet printer incorporating a system as claimed in claim 1.

11. A method of sensing when a stack of sheet material reaches a critical height, the method including the steps of:

using a light source to shine light on the stack surface to form a lighted area such that the lighted area changes in size according to the distance between the light source and the stack surface;

using a detection system to detect changes in size of the lighted area such that the detection system provides an indication that the stack surface has reached a critical distance from the light source when the detection system detects that the lighted area has reached a predetermined size.

12. A method according to claim 11 characterised in that the detection system consists of a light detection system, the method including the step of using the light detection system to monitor a zone on the stack surface in which light monitored as being reflected from the zone varies in accordance with changes in size of said lighted area;

such that the detection system detects that the lighted area has reached the predetermined size when the light shining on the zone has reached a predetermined point.

* * * * *